June 23, 1970     R. G. SLEATER ET AL     3,517,217

SEMICONDUCTOR RELAY SWITCHING CIRCUIT

Filed Aug. 30, 1967     2 Sheets-Sheet 1

Roland G. Sleater
Charles G. Reed
INVENTORS

BY *Clarence A. O'Brien*
and *Harvey B. Jacobson*
Attorneys

June 23, 1970     R. G. SLEATER ET AL     3,517,217

SEMICONDUCTOR RELAY SWITCHING CIRCUIT

Filed Aug. 30, 1967            2 Sheets-Sheet 2

Roland G. Sleater
Charles G. Reed
INVENTORS

# United States Patent Office 3,517,217
Patented June 23, 1970

3,517,217
SEMICONDUCTOR RELAY SWITCHING CIRCUIT
Roland G. Sleater and Charles G. Reed, Phoenix, Ariz., assignors to Signal Computer Corporation, Garland, Tex., a corporation of Texas
Filed Aug. 30, 1967, Ser. No. 664,334
Int. Cl. H03k 17/00
U.S. Cl. 307—252                                5 Claims

ABSTRACT OF THE DISCLOSURE

The transfer of electrical power from one load to another by a solid state switching circuit having a relatively low power consumption compared to the power consumed by the loads. Power supplied from an AC source energizes one of the loads during a major portion of the alternating power cycle through bilateral AC switches controlled by a trigger source of voltage and a diode breakover device.

---

This invention relates to the switching of electrical power from one load to another and more particularly to a semi-conductor type of relay control circuit for controlling the supply of electrical energy from an AC source to at least two loads.

The use of electromechanical relay control circuits for switching electrical loads supplied from an AC power source, are well known. Prolonged reliability of such relay control circuits has however been less than satisfactory because of wear and erosion of mechanical contacts. Furthermore, such relay control circuits have been the cause for arcing and fusing at the mechanical contacts due to excessive voltages induced where the loads have any significant inductive reactance. This has occurred because load current is interrupted during the switching action at random phases in the alternating power cycle of the power source including relatively high current phases.

Accordingly, an important object of the present invention is to provide a relay control circuit by means of which interruption in current during the switching action will always occur at the same point in the alternating power cycle close to zero current flow to thereby minimize induction of any counter EMF voltages because of inductive load reactances.

Yet another object of the present invention is to provide a relay control circuit wherein the mechanical contacts are eliminated so as to avoid contact wear as well as to effect a reduction in size and weight of the control circuit while at the same time switching relatively high power from one load to another with a minimum consumption of power to control the switching action.

The relay control circuit of the present invention utilizes solid state, semiconductor devices of the bidirectional type including triode types consisting of input and output electrodes and a gate electrode as well as diode types having only input and output electrodes. Triode types of bidirectional semi-conductors referred to as "triacs" are now available such as disclosed and discussed in Pat. No. 3,310,687. The present invention also contemplates the use of two complementary silicon controlled rectifiers in parallel, with the gates connected together as the equivalent of such triacs. Also utilized in the relay control circuit of the present invention is a bi-directional semiconductor device referred to as a "diac." In lieu thereof, double anode clipper diodes or back to back zener diodes may be utilized. The foregoing semiconductor devices are arranged in circuit so that one of the triacs will be rendered conductive during most of the alternating power cycle to normally conduct current through one of the electrical loads. A control voltage applied to the gate of the other triac is operative to render it conductive in order to conduct current through the other of the loads and at the same time it is rendered operative through the diac to switch off the first triac. The characteristics of these semiconductors in remaining conductive until the current conducted therethrough decreases below a holding current level, is utilized to insure that current is always interrupted at the same low current phase of the alternating power cycle. The characteristic of the diac in being rendered conductive when a breakdown voltage level is exceeded, insures that one of the loads is normally supplied with current through one of the triacs for most of the alternating power cycle until such time as the loads are switched by a control voltage applied to the other triac.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
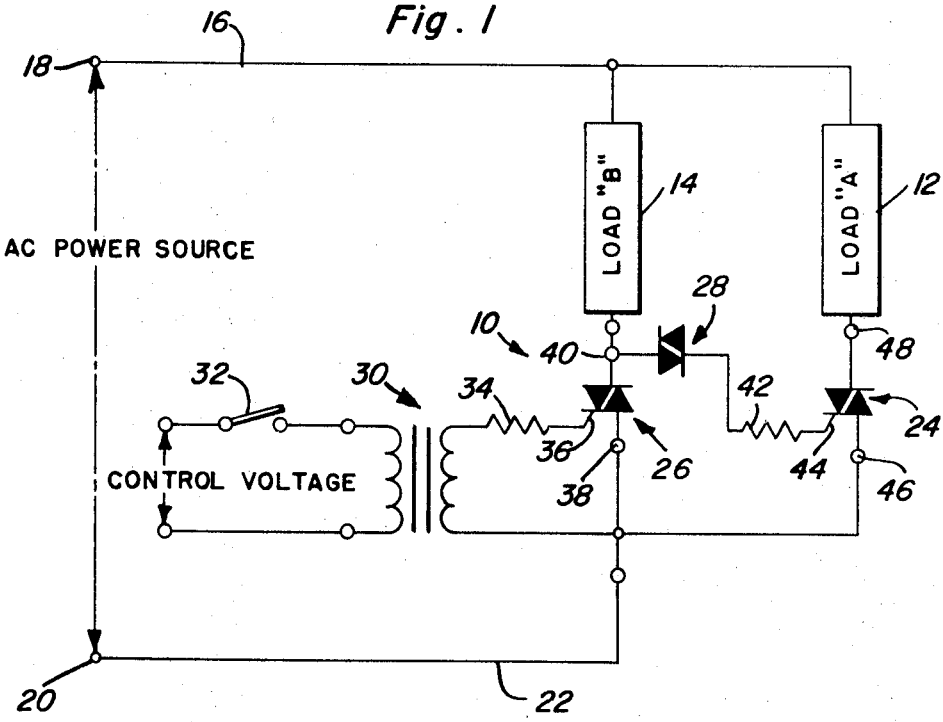
FIG. 1 is an electrical circuit diagram illustrating one form of relay control circuit in accordance with the present invention.

Referring initially to FIG. 1, a relay control circuit generally referred to by reference numeral 10 is shown in combination with two electrical boads 12 and 14. The loads are connected in parallel to a power supply line 16 extending from a power terminal 18. An AC power source is connected to the power terminal 18 and to the power terminal 20 to which the other supply line 22 is connected for completing an energizing circuit through one or the other of the loads 12 and 14.

The power supply line 22 is connected in parallel to a pair of semiconductor devices such as tricas 24 and 26 through which load current may be conducted to the loads 12 and 14 respectively. These semiconductor devices are capable of conducting current in opposite directions and have both non-conductive and conductive states as depicted for example in Pat. No. 3,310,687 aforementioned. The non-conductive states of the semiconductor devices 24 and 26 are accordingly limited by breakdown voltage levels above the peak voltage level of the AC power source. Once the semiconductor devices are switched to the low impedance state, they remain in this state until the current conducted therethrough drops to a holding current level, below which the semiconductor devices switch back to the non-conductive state. Further, in addition to the input and output terminals, each semi-conductor device 24 or 26 is provided with a gate terminal to which a triggering current may be supplied causing the semiconductor device to switch to its conductive state below the breakdown voltage value. A third semiconductor such as diac 28 is included in the control circuit having input and output terminals and also characterized by a breakdown voltage value and a holding current level. The breakdown voltage of the diac is chosen to be below the peak voltage of the power source.

The control circuit 10 shown in FIG. 1 includes a source of control voltage shown to be independent of the AC power source which is applied across the primary winding of an insolation transformer 30 upon closing of the trigger control switch 32. A trigger current is accordingly induced in the secondary winding of the transformer 30 upon closing of the switch 32. The secondary winding of the transformer 30 is coupled by the resistor 34 to the gate terminal 36 of the semiconductor device 28 having terminals 38 and 40 connected to the power supply line 22 and the load 14. The terminal 40 of the semiconductor device 26 is also connected to one of the terminals of semiconductor 28, the other terminal of which is connected by the resistor 42 to the gate terminal 44 of the semiconductor device 24 having input and output terminals 46 and 48 connected to the power supply line 22 and the load 12.

Figure 5:
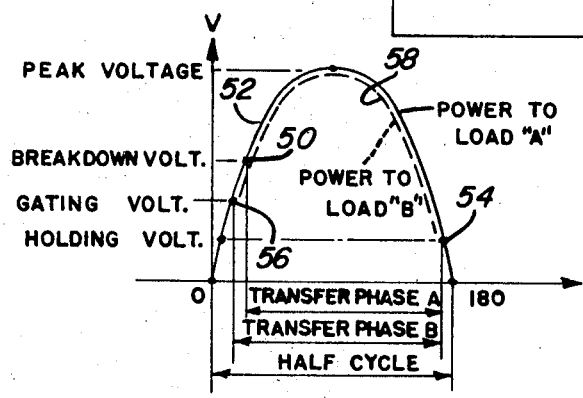
FIG. 5 is a graphical illustration depicting the switching control characteristic associated with the relay control circuits of the present invention.

Normally, when the trigger control switch 32 is opened, an AC voltage will be applied from the power source across the input and output terminals 46 and 48 of the semiconductor device 24. The breakdown voltage level of the semiconductor device 24 is however above the peak voltage value of the AC voltage of the source, a half cycle of which is depicted in FIG. 5. An AC potential is however also applied at juncture 40 to one of the terminals of the semiconductor 28, the breakdown voltage of which is below the peak value of the AC voltage of the power source. Accordingly, when the voltage of the power source reaches the breakdown level associated with semiconductor 28, this semiconductor is switched to its conductive state and passes a trigger current which is conducted through the resistor 42 to the gate 44 of the semiconductor device 24. The semiconductod device 24 is therefore switched to its conductive state in order to conduct load current through the load 12 above the breakdown level 50 of the semiconductor 28 as depicted in FIG. 5. Once the semiconductor device 24 is switched on, it remains conductive until the AC voltage across its input and output terminals drops below the holding level 54 as depicted in FIG. 5. Power is accordingly supplied to the load 12 through semiconductor device 24 during most of the alternating power cycle as depicted by solid line 52.

In order to switch the power to the load 14, the trigger switch 32 is closed so as to supply trigger current through resistor 34 to the gate terminal 36 of semiconductor device 26 causing it to switch it to its conductive state at the gate level point 56 for example as shown in FIG. 5. Accordingly, power will be supplied during most of the alternating power cycle to the load 14 as depicted by the dotted line 58 in FIG. 5. When the semiconductor device 26 is conductive, the potential at terminal juncture 40 drops below the holding level associated with the semiconductor 28 so that gate current is no longer supplied to the semiconductor device 24 which reverts back to its non-conductive state as soon as the potential across its terminals drops below the holding level 54. Thus, switching of power from load 12 to load 14 is occasioned by interruption in the load current conducted through the switched off load 14 at a relatively low value near zero to thereby minimize any induced current because of inductive reactance of the load. When trigger current is removed from the gate terminal 36 of semiconductor 26, the control circuit 10 reverts back to its original state as hereinbefore described.

Figure 2:
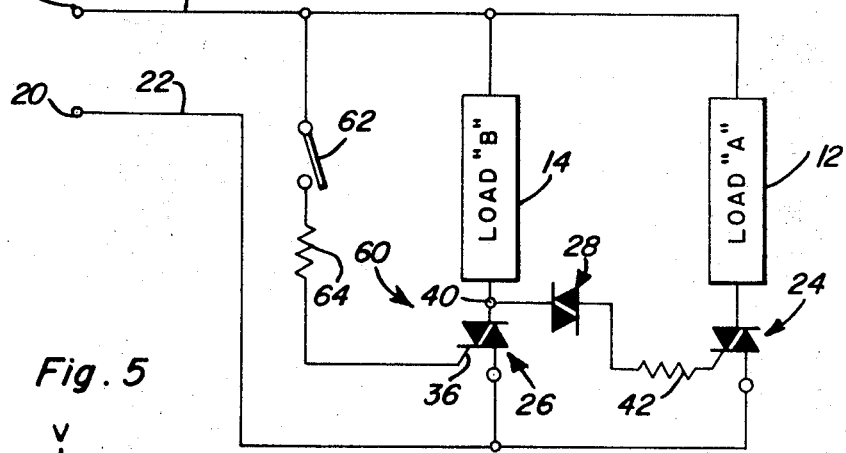
FIG. 2 is an electrical circuit diagram illustrating a second form of relay control circuit.

FIG. 2 illustrates a control circuit 60 associated with the loads 12 and 14 connected in parallel to the AC power source through power lines 16 and 22 as hereinbefore described in connection with FIG. 1. The control circuit 60 also utilizes the bidirectional semiconductor devices 24 and 26 interconnected through the bidirectional semiconductor 28 and resistor 42 as previously described. However, an in-phase trigger current is supplied to the gate terminal 36 of the semiconductor device 26 for switching the power from load 12 to load 14 by closing of the trigger switch 62 connecting the power line 16 through resistor 64 to the gate terminal 36. The control circuit 60 otherwise operates in the same manner as the control circuit 10 hereinbefore described.

Figure 3:
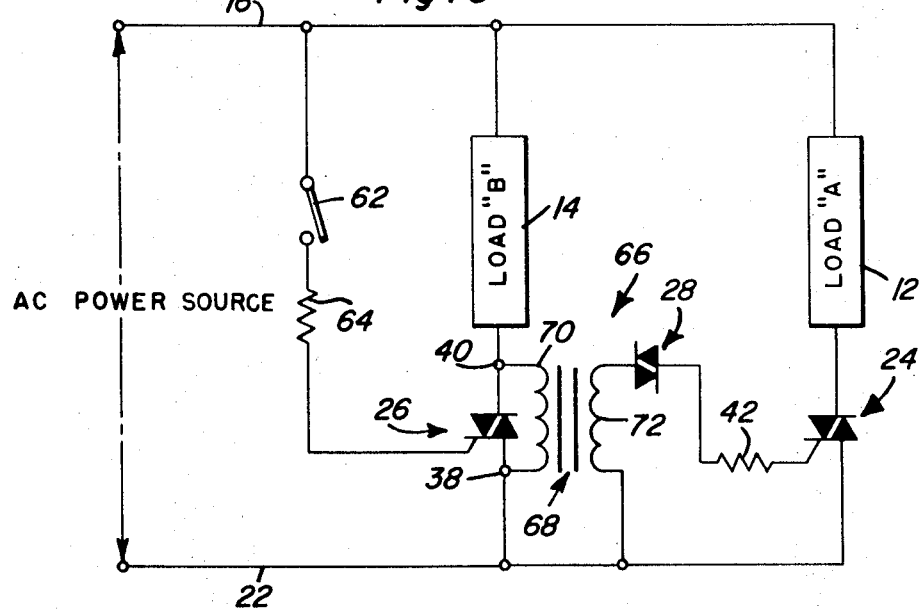
FIG. 3 is a circuit diagram illustrating a third form of relay control circuit.

Operation of the control circuit 66 as illustrated in FIG. 3 is the same as the control circuit 60 of FIG. 2 except that the semiconductor 28 is inductively coupled to the semiconductor device 26. Toward this end, a transformer 68 is provided which includes a primary winding 70 connected across the input and output terminals 38 and 40 of the semiconductor device 26. The secondary winding 72 of the transformer is connected between the power supply line 22 and one of the terminals of semiconductor 28. Accordingly, when the semiconductor device 26 is conducting, the primary winding 70 is effectively shorted out and load current through the semiconductor device 24 is blocked.

Figure 4:
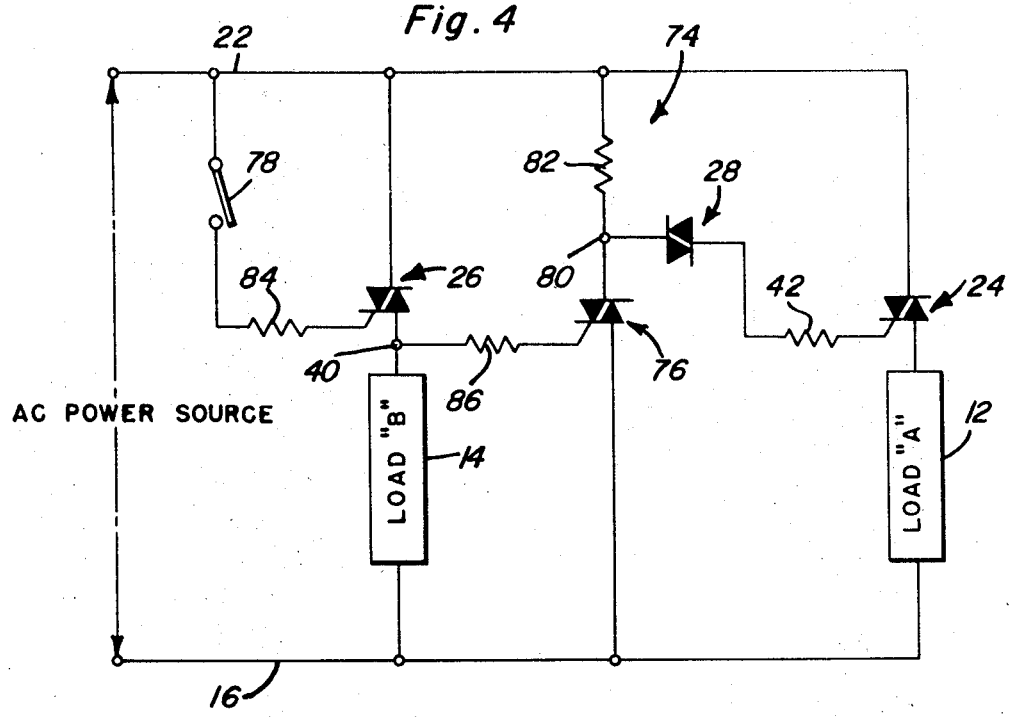
FIG. 4 is an electrical circuit diagram illustrating a fourth form of relay control circuit in accordance with the present invention.

In the previously described control circuits 10, 60 and 66, gate current for switching on the semiconductor device 26 is derived through the load 14 when deenergized. Herein lies the principal difference between the previously described control circuits and the control circuit 74 illustrated in FIG. 4. In control circuit 74, gate current for switching the semiconductor device 24 to the conductive state is derived through a third semiconductor device 76 similar to the semiconductor devices 24 and 26 as hereinbefore described. Normally, with the trigger switch 78 opened, an AC potential is applied to the juncture 80 through resistor 82 connected to the supply line 22 so that during the AC power cycle, breakdown voltage will be applied to the semiconductor 28 if the third semiconductor device 76 is in its non-conductive state. Gate current will accordingly be conducted through resistor 42 to normally maintain the semiconductor device 24 in a conductive state in order to conduct current through the load 12 without drawing any current through the load 14. When the trigger switch 78 is closed, the power supply line 22 is connected through resistor 84 to the gate terminal of semiconductor device 26 switching it on so as to conduct current through the load 14. The terminal 40 being connected through resistor 86 to the gate terminal of semiconductor device 76 will then supply gate current causing semiconductor device 76 to switch on thereby reducing the potential at juncture 80 below holding level. Thus, semiconductor 28 switches off. Gate current is thereby removed from the semiconductor device 24 which switches to its non-conductive state in order to block further flow of load current through the load 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A relay switching circuit for selectively transferring power from a source of AC supply voltage between first and second loads comprising:
   (a) first and second bilaterally AC switches each having first and second power electrodes and a gate electrode, said AC switches normally exhibiting a high impedance between said first and second power loads and being switched to a quasi stable low impedance state when a control signal is applied to the gate electrode and remaining in the quasi stable low impedance state so long as holding current flows through said first and second power electrodes;
   (b) means for connecting said first AC switch by its power electrodes in series with said first load and said AC voltage;
   (c) means for connecting said second AC switch by its power electrodes in series with said second load and said AC voltage;
   (d) means for selectively connecting said AC supply to the gate electrode of the first AC switch to cause said first AC switch to switch to the quasi stable low impedance state and remain in the low impedance state during each half-cycle of the applied AC voltage in which the control signal is applied;

(e) a breakover device having two power electrodes and which normally exhibits a high impedance between said two power electrodes but which is switched to a quasi stable low impedance state when the voltage impressed between said two power electrodes exceeds the breakover voltage of said device and which remains in the quasi stable low impedance state so long as holding current flows through said two power electrodes, said breakover voltage being substantially less than the maximum instantaneous peak voltage of the AC voltage source; and (f) means for connecting said breakover device by its two power terminals to apply to the gate electrode of the second AC switch a control signal only during half cycles of the applied AC voltage that the instantaneous voltage level of the AC voltage attains a level sufficient to cause the breakover device to switch to the quasi stable low impedance state prior to the first AC switch being switched to the low impedance state.

2. A circuit as defined in claim 1 wherein said means for selectively connecting comprises a switch contact positionable in a closed position when power is to be applied to the first load and positionable to an open position when power is to be applied to the second load.

3. A circuit as defined in claim 1 wherein said means for connecting said breakover device comprises a third AC switch, means connecting the gate electrode of said third AC switch to one of the power electrodes of the first AC switch to cause the conductivity state of said third AC switch to be the same as said first AC switch and means connecting the breakover device to apply a potential in excess of the breakover voltage to the breakover device during half cycles in which said third AC switch does not switch to the low impedance state.

4. A circuit as defined in claim 1 wherein one power terminal of said breakover device is connected to the juncture between the first load and the first AC switch and its second power terminal is connected to the gate electrode of the second AC switch.

5. A circuit as defined in claim 1 further including resistance means connected in circuit with each of said gate electrodes for limiting the current flowing in said gate electrodes.

References Cited

UNITED STATES PATENTS 3,337,741   8/1967   Mislan   307—257
3,176,150   3/1965   McMurray   330—15

OTHER REFERENCES

J. H. Galloway, using the Triac for control of A.C. power March 1966, p. 17 and p. 5, General Electric.

DONALD D. FORRER, Primary Examiner

D. M. CARTER, Assistant Examiner

U.S. Cl. X.R.

307—241, 305